United States Patent
Okada et al.

(10) Patent No.: US 11,764,661 B2
(45) Date of Patent: Sep. 19, 2023

(54) EDDY CURRENT DECELERATION DEVICE

(71) Applicant: NIPPON STEEL CORPORATION, Tokyo (JP)

(72) Inventors: Hirokazu Okada, Tokyo (JP); Yasutaka Noguchi, Tokyo (JP); Nao Otaki, Tokyo (JP); Tetsuya Yamada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 31 days.

(21) Appl. No.: 17/596,215

(22) PCT Filed: Jun. 2, 2020

(86) PCT No.: PCT/JP2020/021722
§ 371 (c)(1),
(2) Date: Dec. 6, 2021

(87) PCT Pub. No.: WO2020/246454
PCT Pub. Date: Dec. 10, 2020

(65) Prior Publication Data
US 2022/0320988 A1  Oct. 6, 2022

(30) Foreign Application Priority Data
Jun. 6, 2019  (JP) .................. 2019-106484

(51) Int. Cl.
*H02K 49/04* (2006.01)
*H02K 1/17* (2006.01)

(52) U.S. Cl.
CPC ............... *H02K 49/04* (2013.01); *H02K 1/17* (2013.01)

(58) Field of Classification Search
CPC .................. H02K 49/04; H02K 1/17
USPC .......................................... 310/105
See application file for complete search history.

(56) References Cited

U.S. PATENT DOCUMENTS

2015/0061472 A1* 3/2015 Leng .................. H02K 1/02
310/68 D

FOREIGN PATENT DOCUMENTS

| JP | 11308851 A | | 11/1999 |
| JP | 2002171744 A | * | 6/2002 |
| JP | 2002171744 A | | 6/2002 |
| JP | 2005020823 A | * | 1/2005 |
| JP | 2005020823 A | | 1/2005 |

* cited by examiner

*Primary Examiner* — Jose A Gonzalez Quinones
(74) *Attorney, Agent, or Firm* — Greer, Burns & Crain, Ltd.

(57) ABSTRACT

The eddy current deceleration device according to the present disclosure includes: a stator including a cylindrical body and a plurality of magnets disposed on an outer circumferential surface of the cylindrical body; and a rotor including a cylindrical part that houses the cylindrical body, wherein the cylindrical part of the rotor includes, on an inner circumferential surface of the cylindrical part, in order closest to the inner circumferential surface: a first layer consisting of one of an Ni—P alloy that is an Ni alloy consisting of P with the balance being Ni and impurities and an Ni—B alloy that is an Ni alloy consisting of B with the balance being Ni and impurities; a second layer consisting of nickel; a third layer consisting of one of copper and copper alloy; a fourth layer consisting of nickel alloy; and a fifth layer consisting of nickel.

4 Claims, 3 Drawing Sheets

EDDY CURRENT DECELERATION DEVICE

TECHNICAL FIELD

The present disclosure relates to an eddy current deceleration device.

BACKGROUND ART

Large automobiles such as buses and trucks include a braking device such as a foot brake and an exhaust brake. Large automobiles may further include an eddy current deceleration device. Eddy current deceleration devices are called retarders. For example, in a case of traveling a long, steep downhill or the like and when a traveling speed of a large automobile is difficult to reduce even with an engine brake or an exhaust brake used in combination, braking force can be further increased by activating an eddy current deceleration device, so that the traveling speed of the large automobile can be reduced effectively. In recent years, reduction of displacement has been promoted by improving fuel efficiency and electrification of vehicles against a backdrop of increasingly severe environmental issues, following which braking force of exhaust brakes has been decreased. In addition, installation of eddy current deceleration devices in trucks and trailers that have payloads larger than those of conventional trucks and trailers has been promoted. For that reason, eddy current deceleration devices having greater braking forces are required.

Eddy current deceleration devices are categorized into an electromagnetic type and a permanent-magnet type. A permanent magnet eddy current deceleration device includes a rotor and a stator that is housed in the rotor. The rotor includes a cylindrical part (drum), an annular wheel part that fixes the rotor to a propeller shaft, and a plurality of arm parts that connect the cylindrical part and the wheel part. The stator includes a cylindrical body, a plurality of permanent magnets of two types that are different in polarity, and a plurality of pole pieces. The plurality of permanent magnets of different polarities are arranged alternately in a circumferential direction on an outer circumferential surface of the cylindrical body. The pole pieces are disposed between an inner circumferential surface of the cylindrical part of the rotor and the permanent magnets. In the stator, the cylindrical body to which the permanent magnets are attached is rotatable about an axis of the cylindrical body independently of the plurality of pole pieces.

In braking, that is, when the eddy current deceleration device is activated, magnetic fluxes from the permanent magnets of the stator reach the rotor via the pole pieces, by which magnetic circuits are formed between the permanent magnets and the cylindrical part of the rotor. At this time, eddy currents are generated in the cylindrical part of the rotor. By the generation of the eddy currents, the Lorentz force is generated. This Lorentz force serves as braking torque, applying braking force to a large automobile. In contrast, in non-braking, that is, when operation of the eddy current deceleration device is stopped, relative positions of the permanent magnets to the pole pieces are shifted so that the magnetic fluxes from the permanent magnets do not reach the rotor. In this case, no magnetic circuits are formed between the permanent magnets and the cylindrical part of the rotor. As a result, the eddy currents are not generated in the cylindrical part of the rotor, and the braking force is not generated, either. By the operation described above, the eddy current deceleration device performs a braking operation and a non-braking operation.

The braking force of the eddy current deceleration device depends on an amount of the eddy currents that are generated in the cylindrical part of the rotor in braking. It is therefore preferable that the amount of the eddy currents generated in the cylindrical part of the rotor in braking be large. To increase the amount of the eddy currents generated in braking, it is preferable that an electric resistance of the cylindrical part of the rotor be low.

An inner circumferential surface of the cylindrical part of the rotor may be formed with a plating coating for decreasing the electric resistance. The braking force of the eddy current deceleration device is thereby further increased.

At the same time, in braking by the eddy current deceleration device, the rotor is heated by Joule heating that occurs with the eddy currents. In braking by the eddy current deceleration device, the rotor is exposed to high temperature more than 600° C. In contrast, in non-braking by the eddy current deceleration device, the rotor is rapidly cooled (air-cooled) by a plurality of cooling fins that are formed on an outer circumferential surface of the cylindrical part of the rotor. In other words, with repeated braking and non-braking, the rotor is subjected to thermal cycles. A plating coating formed on the inner circumferential surface of the cylindrical part of the rotor is required to have sufficient durability for enduring the thermal cycles.

As described above, eddy current deceleration devices having greater braking forces have recently been required. With an increase in braking force, an inner circumferential surface of a cylindrical part of a rotor of an eddy current deceleration device in braking may have a higher temperature. It is therefore desirable that the plating coating provided on the inner circumferential surface of the cylindrical part of the rotor be further improved in thermal durability.

Japanese Patent Application Publication No. 11-308851 (Patent Literature 1), Japanese Patent Application Publication No. 2005-020823 (Patent Literature 2), and Japanese Patent Application Publication No. 2002-171744 (Patent Literature 3) propose techniques for improving durability when a rotor is exposed to thermal cycles.

An eddy current deceleration device disclosed in Patent Literature 1 is an eddy current deceleration device of a type that includes a rotor and magnets fixedly provided facing a rotating surface of the rotor and generates eddy currents in the rotor with magnetic fluxes from the magnets. The eddy current deceleration device is characterized in that the rotating surface facing the magnets is provided with a first layer made of nickel-based alloy, a second layer made of copper or copper alloy, a third layer made of nickel-based alloy, and a fourth layer made of nickel, one after another. Patent Literature 1 describes that this provides an eddy current deceleration device that is so excellent in durability as to prevent cracking in a surface protection layer and restrains peeling of the copper or copper alloy layer from a ferromagnet cylindrical part under a harsh use condition that a temperature of the rotor can reach about 650° C.

A structure disclosed in Patent Literature 2 includes, in order closest to a surface of the structure, a first layer that is made of nickel alloy, a second layer that constitutes a high-conductivity layer containing at least one type of copper, copper alloy, aluminum, and aluminum alloy each having a higher conductivity than a conductivity of a member mainly constituting the structure, a third layer that is made of nickel alloy, and a fourth layer that is made of nickel alone. The structure is characterized by including, on at least a part of the structure, a conductive coating in which the first layer and the third layer are made of the same alloy component of at least one type of phosphorus, tungsten, boron, iron, and cobalt, and a content of the alloy component in the first layer is smaller than a content of the alloy component in the third layer in mass % of the alloy component. Patent Literature 2 describes that it is thereby possible to maintain a property of a higher conductivity in an environment in which the structure is exposed to high-temperature, high-load thermal cycles, so that a structure more excellent in high-temperature durability and thermal cycling resistance than conventional one is provided.

An eddy current deceleration device disclosed in Patent Literature 3 is an eddy current deceleration device of a type that includes a rotor having a rotating body made of ferromagnetic material, the rotor being connected to a rotating shaft, includes a plurality of magnets disposed at positions at which the magnets face an inner wall surface of the rotating body with a predetermined space, and generates eddy currents in the rotor with magnetic fluxes from the magnets to reduce a speed. The eddy current deceleration device is characterized in that a surface roughness of a surface facing the magnets of the rotating body is 10 µm or less in ten point average roughness Rz, and on the surface, a first layer made of copper or copper alloy, a second layer made of nickel alloy, and a third layer made of nickel are provided one after another. Patent Literature 3 describes that this provides an eddy current deceleration device that is so excellent in durability that a surface processed layer provided on the rotating body of the rotor does not peel off nor separate even in a case where the eddy current deceleration device is used for a long time.

CITATION LIST

Patent Literature

Patent Literature 1: Japanese Patent Application Publication No. 11-308851
Patent Literature 2: Japanese Patent Application Publication No. 2005-020823
Patent Literature 3: Japanese Patent Application Publication No. 2002-171744

SUMMARY OF INVENTION

Technical Problem

By techniques such as those disclosed in Patent Literature 1 to Patent Literature 3 described above, it is possible to improve durability at exposure of a rotor to 650° C. thermal cycles, so that an eddy current deceleration device excellent in high-temperature durability is provided.

However, usage environments of eddy current deceleration devices have recently become harsher. Thus, there is a demand for an eddy current deceleration device that has durability even when exposed to higher thermal cycles.

An objective of the present disclosure is to provide an eddy current deceleration device that has excellent durability even when exposed to 700° C. thermal cycles.

Solution to Problem

The eddy current deceleration device according to the present disclosure includes:
a stator including a cylindrical body and a plurality of magnets disposed on an outer circumferential surface of the cylindrical body; and
a rotor including a cylindrical part that houses the cylindrical body, wherein the cylindrical part of the rotor includes, on an inner circumferential surface of the cylindrical part, in order closest to the inner circumferential surface:
a first layer consisting of one of an Ni—P alloy that is a Ni alloy consisting of P with the balance being Ni and impurities and an Ni—B alloy consisting of B with the balance being Ni and impurities;
a second layer consisting of nickel;
a third layer consisting of one of copper and copper alloy;
a fourth layer consisting of nickel alloy; and
a fifth layer consisting of nickel.

Advantageous Effect of Invention

An eddy current deceleration device according to the present disclosure has excellent durability even when exposed to 700° C. thermal cycles.

DESCRIPTION OF EMBODIMENT

The present inventors conducted investigations and studies about durability of an eddy current deceleration device when exposed to 700° C. thermal cycles.

A plating coating formed on an inner circumferential surface of a cylindrical part of a rotor preferably has low electric resistance. Using a plating layer containing copper can decrease the electric resistance, increasing braking force of the eddy current deceleration device. Hereinafter, the plating layer containing copper will be also referred to as "copper layer".

As described above, the inner surface of the rotor is to be exposed to thermal cycles at more than 600° C. Adhesiveness of the copper layer is unlikely to decrease even at exposure to thermal cycles when the thermal cycles are within a normal temperature range. However, at exposure to harsh thermal cycles at more than 600° C., the adhesiveness of the copper layer may decrease. When it is possible to increase the adhesiveness of the copper layer, thermal durability of the eddy current deceleration device is increased.

Prior studies showed that, when two different types of metals are brought into close contact with each other and heated, metal atoms thermally diffuse to enter opposite metals, moving a boundary surface between the two metals, which is known as the Kirkendall effect. The Kirkendall effect arises due to a difference in diffusion velocity between two metals in close contact. When the difference in diffusion velocity between the two metals in close contact is large, the diffusion of metal atoms results in voids. The voids are called Kirkendall voids. If Kirkendall voids are produced in an interface between the copper layer and another plating layer or an interface between the copper layer and the cylindrical part of the rotor, adhesiveness of the copper layer decreases, and thermal durability of the eddy current deceleration device decreases.

Patent Literature 2 describes that Kirkendall voids are prevented or reduced by forming a plating layer made of nickel alloy between a cylindrical part of a rotor and a copper layer. The paragraph [0015] of Patent Literature 2 describes that occurrence of Kirkendall voids due to diffusion needs to be eliminated for the first layer and the third layer made of the nickel alloy, and when a concentration of the alloy component is increased to enhance an effect of preventing the diffusion, the occurrence of Kirkendall voids is eliminated, so that peeling of the coating can be restrained.

Patent Literature 3 also describes that Kirkendall voids are prevented or reduced by forming a plating layer made of nickel alloy. According to Patent Literature 3, the second layer made of nickel alloy is formed between the first layer being a copper layer and the third layer being a nickel layer. The paragraph [0036] of Patent Literature 3 describes that the second layer made of nickel alloy restrains production of diffusion voids that are produced by diffusion of copper or copper alloy in the first layer or nickel in the third layer. In addition, the paragraph [0037] of Patent Literature 3 describes that a nickel alloy containing tungsten, iron, boron, cobalt, phosphorus, or the like as an alloying element has a diffusion velocity of copper lower than that of nickel and thus makes it difficult for copper atoms to enter a nickel lattice or an iron lattice.

The paragraph [0017] of Patent Literature 1 points out that, when nickel is used as a buffer material between the copper layer and the cylindrical part, diffusion from copper to nickel occurs during a long time use, which produces pores (Kirkendall voids) on a copper side of an interface between copper and nickel, and thus a plating layer containing copper may peel off and drop off. The paragraph [0022] of Patent Literature 1 describes that, when a nickel-based alloy layer is foamed as the buffer material between the copper layer and the cylindrical part, the nickel-based alloy layer satisfies functions of preventing the diffusion and the buffer material.

In the field of eddy current deceleration devices, improvement of durability by preventing or reducing Kirkendall voids is an important issue. Thus, to prevent or reduce Kirkendall voids, prior studies involve formation of a plating layer made of nickel alloy (hereinafter, also referred to as nickel alloy layer) between a cylindrical part of a rotor and a copper layer. In addition, prior studies show that nickel alloy is more effective in preventing or reducing Kirkendall voids compared with nickel.

According to Patent Literatures 1 to 3, Kirkendall voids are prevented or reduced in an eddy current deceleration device in which an inner circumferential surface of a cylindrical part of a rotor is formed with a nickel alloy layer and a copper layer in order closest to the inner circumferential surface, and the eddy current deceleration device has a high thermal durability even at exposure to 650° C. thermal cycles.

However, a study by the present inventors revealed that even the eddy current deceleration device in which the inner circumferential surface of the cylindrical part of the rotor is formed with the nickel alloy layer and the copper layer in order closest to the inner circumferential surface may cause peeling of the copper layer in a harsher thermal environment, particularly at exposure to 700° C. thermal cycles. The present inventors conducted detailed studies about what caused this peeling and consequently obtained the following findings, which are different from conventional findings.

On a nickel alloy layer, a passivation film is formed. In a case where a copper layer is formed on the nickel alloy layer, the copper layer is formed with the passivation film interposed therebetween. At exposure to 700° C. thermal cycles, the passivation film may cause peeling at an interface between the nickel alloy layer and the copper layer.

The present inventors conducted studies about a method for restraining the peeling of a copper layer resulting from a passivation film on a nickel alloy layer. As a result, the following findings were obtained. When a plating layer made of nickel (hereinafter, also called "nickel layer") is formed on a nickel alloy layer, a passivation film on the nickel alloy layer is removed. In addition, a passivation film resists being formed on a nickel layer. The present inventors thus considered that, by additionally forming a nickel layer between a nickel alloy layer and a copper layer, the peeling of the copper layer resulting from a passivation film can be restrained. In this case, it is possible to increase adhesiveness of the copper layer at exposure to 700° C. thermal cycles, thus further increasing thermal durability of an eddy current deceleration device.

The present inventors further obtained the following findings. When a nickel layer is formed on a nickel alloy layer made of Ni—P alloy or Ni—B alloy, an alloy component (P or B) diffuses from the nickel alloy layer made of the Ni—P alloy or the Ni—B alloy into the nickel layer under an environment at 700° C. P or B that has entered and diffused into the nickel layer reaches an interface between the nickel layer and the copper layer, thereby decreasing a diffusion velocity of copper into the nickel layer. Therefore, Kirkendall voids are prevented or reduced by further forming a nickel layer between a nickel alloy layer made of Ni—P alloy or Ni—B alloy and a copper layer.

This phenomenon is peculiar to phosphorus (P) or boron (B), an atomic radius of which is relatively small. Having relatively small atomic radii, P and B diffuse in a nickel layer while penetrating a crystal lattice (interstitial diffusion). Therefore, P and B have high diffusion velocities in a nickel layer. Having high diffusion velocities in a nickel layer, P and B rapidly reaches an interface between a nickel layer and a copper layer, restraining diffusion of copper into the nickel layer. In contrast, in a case of an element having a relatively large atomic radius such as iron (Fe), cobalt (Co), and tungsten (W), the element diffuses while substituting for an Ni element constituting a crystal lattice (substitutional diffusion). Therefore, for example, Fe, Co, and W have low diffusion velocities in a nickel layer. Having low diffusion velocities in a nickel layer, Fe, Co, and W cannot rapidly reach an interface between a nickel layer and a copper layer, and thus the diffusion of copper into the nickel layer cannot be restrained.

From the above, unlike prior study results showing that a nickel alloy layer is more preferable than a nickel layer as a plating layer to be in contact with a copper layer, the present inventors found that, by further forming a nickel layer between a nickel alloy layer made of Ni—P alloy or Ni—B alloy and a copper layer, it is possible to increase adhesiveness of the copper layer in a case of experiencing 700° C. thermal cycles.

The eddy current deceleration device according to the present disclosure based on the findings described above includes the following configurations.

An eddy current deceleration device according to [1] includes:
- a stator including a cylindrical body and a plurality of magnets disposed on an outer circumferential surface of the cylindrical body; and
- a rotor including a cylindrical part that houses the cylindrical body, wherein
- the cylindrical part of the rotor includes, on an inner circumferential surface of the cylindrical part, in order closest to the inner circumferential surface:
  - a first layer consisting of one of an Ni—P alloy that is an Ni alloy consisting of P with the balance being Ni and impurities and an Ni—B alloy that is an Ni alloy consisting of B with the balance being Ni and impurities;
  - a second layer consisting of nickel;
  - a third layer consisting of one of copper and copper alloy;
  - a fourth layer consisting of nickel alloy; and
  - a fifth layer consisting of nickel.

In the eddy current deceleration device according to the present disclosure, the second layer being a nickel layer is formed between the first layer made of Ni—P alloy or Ni—B alloy and the third layer being a copper layer, on the inner circumferential surface of the cylindrical part of the rotor. As a result, Kirkendall voids are prevented or reduced, and peeling of the copper layer resulting from a passivation film on the nickel alloy layer is restrained, so that adhesiveness of the copper layer at exposure to 700° C. thermal cycles increases.

An eddy current deceleration device according to [2] is the eddy current deceleration device according to [1], wherein
the first layer consists of one of the Ni—P alloy that contains 2.0 to 20.0% by mass of P with the balance being Ni and impurities and the Ni—B alloy that contains 1.0 to 20.0% by mass of B with the balance being Ni and impurities.

In this case, it is possible to prevent or reduce Kirkendall voids more stably.

An eddy current deceleration device according to [3] is the eddy current deceleration device according to [1] or [2], wherein
a thickness of the second layer is 0.1 to 5.0

When the thickness of the second layer is 0.1 to 5.0 μm, it is possible to remove a passivation film on the first layer more sufficiently and to prevent or reduce Kirkendall voids more stably.

An eddy current deceleration device according to the present disclosure will be described in detail.

Configuration of Eddy Current Deceleration Device

Figure 1:
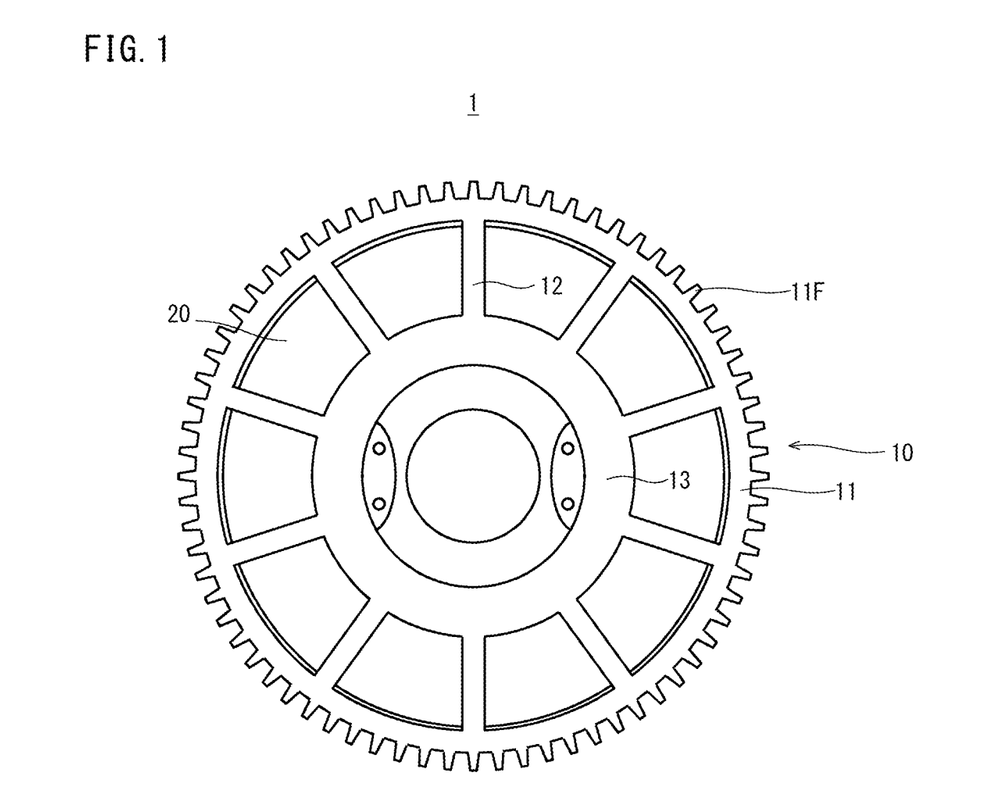
FIG. 1 is a front view of an eddy current deceleration device.

FIG. 1 is a front view of the eddy current deceleration device. Referring to FIG. 1, an eddy current deceleration device 1 includes a rotor 10 and a stator 20.

Figure 2:
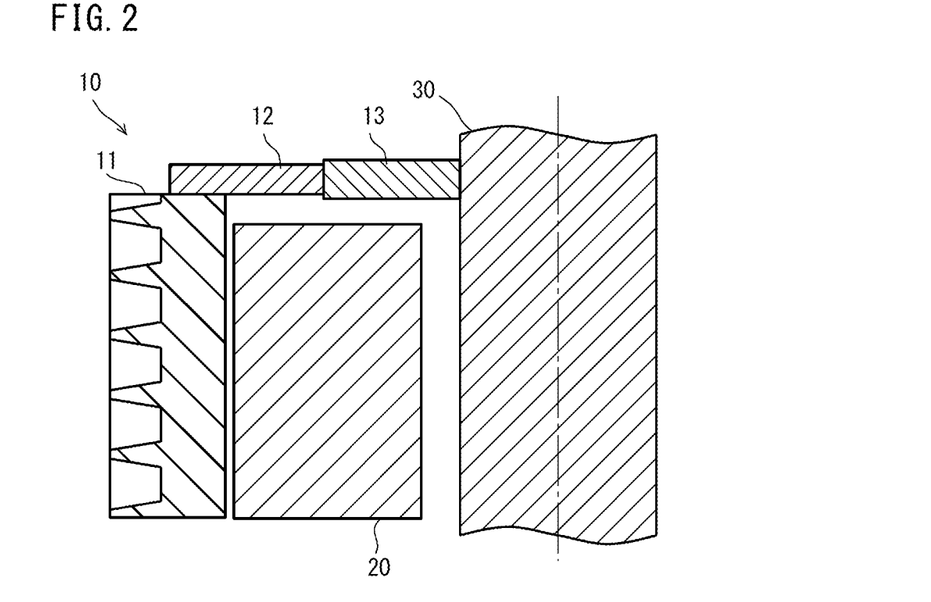
FIG. 2 is a cross-sectional view of the eddy current deceleration device illustrated in FIG. 1 in an axial direction of a propeller shaft, the eddy current deceleration device being fixed to the propeller shaft.

FIG. 2 is a cross-sectional view of the eddy current deceleration device illustrated in FIG. 1 in an axial direction of a propeller shaft, the eddy current deceleration device 1 being fixed to the propeller shaft. Referring to FIG. 2, in the present embodiment, the rotor 10 is fixed to a propeller shaft 30, and the stator 20 is fixed to a transmission not illustrated. Referring to FIG. 1 and FIG. 2, the rotor 10 includes a cylindrical part (drum) 11, arm parts 12, and a wheel part 13.

The cylindrical part 11 is cylindrical and has an inner diameter that is larger than an outer diameter of the stator 20. The wheel part 13 is an annular member having an outer diameter smaller than the inner diameter of the cylindrical part 11 and has a through hole at its center portion. The wheel part 13 is fixed to the propeller shaft 30 by inserting the propeller shaft 30 into a through hole of the wheel part 13. The arm parts 12 connect an end portion of the cylindrical part 11 and the wheel part 13 as illustrated in FIG. 1 and FIG. 2. On an outer circumferential surface of the cylindrical part 11, a plurality of cooling fins 11F are formed.

Figure 3:
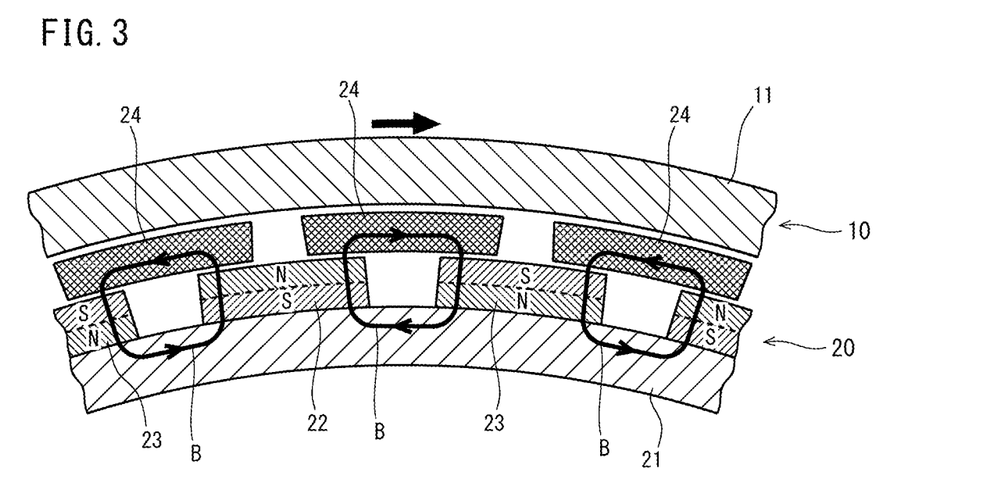
FIG. 3 is a cross-sectional view of the eddy current deceleration device in a direction perpendicular to the axial direction of the eddy current deceleration device (a cross-sectional view in a radial direction), the eddy current deceleration device being in non-braking.

FIG. 3 is a cross-sectional view of the eddy current deceleration device 1 in a direction perpendicular to the axial direction (a cross-sectional view in a radial direction), the eddy current deceleration device 1 being in non-braking. Referring to FIG. 3, the stator 20 includes a magnet holding ring 21 having a cylindrical shape, a plurality of permanent magnets 22 and 23, and a plurality of pole pieces 24. The permanent magnets 22 and the permanent magnets 23 are arranged alternately in a circumferential direction on an outer circumferential surface of the magnet holding ring 21. An inner circumferential surface of the cylindrical part 11 of the rotor 10 faces the permanent magnets 22 and 23 that are disposed on an outer circumferential surface of the retention ring 21 of the stator 20. Of surfaces of each permanent magnet 22, a surface that faces the inner circumferential surface of the cylindrical part 11 of the rotor 10 has the N pole. Of surfaces of each permanent magnet 23, a surface that faces the inner circumferential surface of the cylindrical part 11 of the rotor 10 has the S pole. The plurality of pole pieces 24 are arranged in a circumferential direction of the stator 20. The plurality of pole pieces 24 are arranged between the plurality of permanent magnets 22 and 23 and the inner circumferential surface of the cylindrical part 11.

Operation of Eddy Current Deceleration Device 1 in Braking or in Non-Braking

Referring to FIG. 3, in non-braking, when the eddy current deceleration device 1 is seen in its radial direction, each permanent magnet 22 or 23 overlaps two adjacent pole pieces 24. In this case, magnetic fluxes B flow through the stator 20 as illustrated in FIG. 3; specifically, the magnetic fluxes B flow through the permanent magnets 22 and 23, the pole pieces 24, and the magnet holding ring 21. In this case, no magnetic circuits are formed between the rotor 10 and the permanent magnets 22 and 23, and thus the Lorentz force is not generated in the rotor 10. As a result, braking force is not generated.

Figure 4:
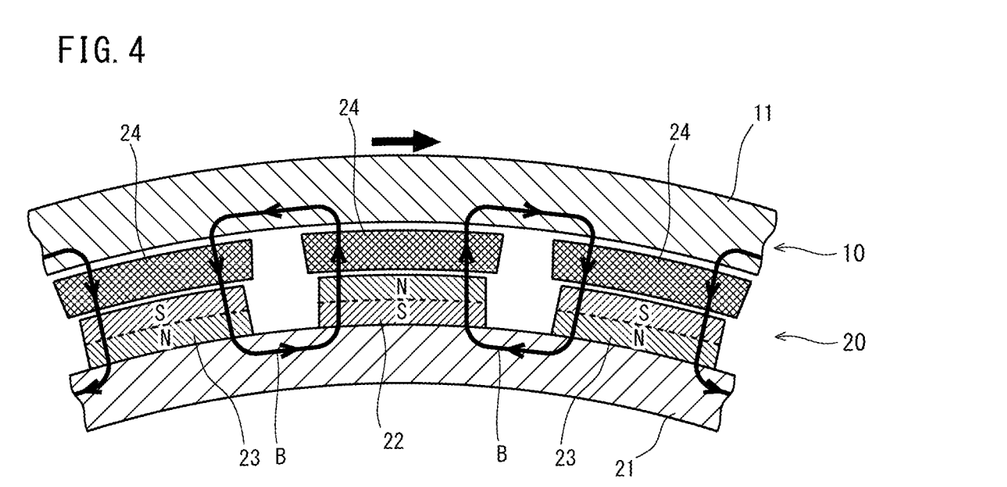
FIG. 4 is a cross-sectional view of the eddy current deceleration device in the direction perpendicular to the axial direction of the eddy current deceleration device (a cross-sectional view in the radial direction), the eddy current deceleration device being in braking.

FIG. 4 is a cross-sectional view of the eddy current deceleration device 1 in the direction perpendicular to the axial direction (a cross-sectional view in a radial direction), where the eddy current deceleration device 1 is in braking. In braking, the magnet holding ring 21 of the stator 20 rotates to shift relative positions of the permanent magnets 22 and 23 to the pole pieces 24 as compared with FIG. 3. Specifically, in FIG. 4, when the eddy current deceleration device 1 is seen in the radial direction, each permanent magnet 22 or 23 overlaps only one pole piece 24 and does not overlap two pole pieces 24. Thus, as illustrated in FIG. 4, the magnetic fluxes B flow through the magnet holding ring 21, the permanent magnet 22 or 23, the pole pieces 24 and the cylindrical part 11. In this case, a magnetic circuit is formed between the rotor 10 and the permanent magnet 22 or 23. At this time, eddy currents are generated in the cylindrical part 11 of the rotor 10. By the generation of the eddy currents, the Lorentz force is generated. This Lorentz force serves as braking torque, generating braking force.

As described above, the eddy current deceleration device 1 generates braking force with the eddy currents generated in the rotor 10. Therefore, it is preferable that a larger magnitude of eddy currents is generated in the cylindrical part 11 of the rotor 10. The lower the electric resistance of the cylindrical part 11 is, the larger the magnitude of the generated eddy currents is. Therefore, it is preferable that the electric resistance of the cylindrical part 11 of the rotor 10 is lower. The eddy currents flow in a vicinity of the inner circumferential surface of the cylindrical part 11 of the rotor 10. Therefore, in the eddy current deceleration device 1 according to the present disclosure, the inner circumferential surface of the cylindrical part 11 of the rotor 10 is made to have a low electric resistance in its vicinity by forming a plating layer on the inner circumferential surface of the cylindrical part 11 of the rotor 10. In addition, with repeated braking and non-braking, the rotor 10 is subjected to thermal cycles. As described above, the eddy current deceleration device 1 preferably has excellent durability even when exposed to 700° C. thermal cycles. It is therefore preferable that the plating layer formed on the inner circumferential surface of the cylindrical part 11 of the rotor 10 have excellent durability when exposed to the 700° C. thermal cycles. The rotor 10 will be described below in detail.

Figure 5:
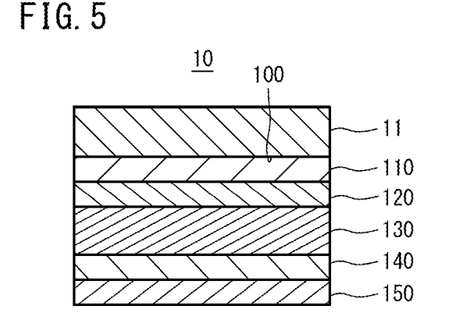
FIG. 5 is an enlarged view of a cross section of the cylindrical part of the rotor in a direction perpendicular to an axial direction of the cylindrical part.

FIG. 5 is an enlarged view of a cross section of the cylindrical part 11 of the rotor 10 in a direction perpendicular to an axial direction of the cylindrical part 11. Referring to FIG. 5, the cylindrical part 11 of the rotor 10 includes, on an inner circumferential surface 100, a first layer 110, a second layer 120, a third layer 130, a fourth layer 140, and a fifth layer 150 in order closest to the inner circumferential surface 100. The first layer 110 to the fifth layer 150 are each a plating layer. Each plating layer will be described below in detail.

First Layer

The first layer 110 is a plating layer that is formed on the inner circumferential surface 100 of the cylindrical part 11 of the rotor 10. The first layer 110 is consisting of nickel alloy. The first layer 110 relieves inelastic strain that is caused due to a difference in coefficient of thermal expansion between the cylindrical part 11 of the rotor 10 and the third layer 130, which is a high-conductivity layer. In addition, the first layer 110 restrains copper atoms contained in the third layer 130 from diffusing into the cylindrical part 11.

The Ni alloy of the first layer 110 is any one of Ni—P alloy that is a Ni alloy consisting of P with the balance being Ni and impurities and Ni—B alloy that is a Ni alloy consisting of B with the balance being Ni and impurities.

In a case where nickel alloy contains phosphorus (P) or boron (B) in addition to Ni as an alloying element, a diffusion velocity of copper in the nickel alloy is low compared with a diffusion velocity of copper in nickel (pure nickel). Therefore, copper atoms contained in the third layer 130 are less likely to enter the first layer 110. In addition, P or B contained in the first layer 110 diffuses into the second layer 120 under an environment at 700° C. This makes copper atoms contained in the third layer 130 less likely to enter the second layer 120.

In a case where the nickel alloy is Ni—P alloy, the nickel alloy consists of phosphorus (P) with the balance being nickel (Ni) and impurities. A lower limit of a content of P in the Ni—P alloy is preferably 0.1% by mass, more preferably 0.5% by mass. An upper limit of the content of P in the Ni—P alloy is preferably 20.0% by mass. When the content of P is 20.0% by mass or less, it is possible to restrain a hardness of the first layer 110 from increasing, increase toughness, and restrain the first layer 110 from peeling off or cracking.

To stably suppress Kirkendall voids further more, the lower limit of the content of P in the Ni—P alloy is more preferably 2.0% by mass, still more preferably 3.0% by mass. The upper limit of the content of P is more preferably 15.0% by mass.

In a case where the nickel alloy is Ni—B alloy, the nickel alloy consists of boron (B) with the balance being nickel (Ni) and impurities. A lower limit of a content of B in the Ni—B alloy is preferably 0.1% by mass, more preferably 0.2% by mass. An upper limit of the content of B in the Ni—B alloy is preferably 20.0% by mass. When the content of B is 20.0% by mass or less, it is possible to restrain the hardness of the first layer 110 from increasing, increase toughness, and restrain the first layer 110 from peeling off or cracking.

To stably suppress Kirkendall voids further more, the lower limit of the content of B in the Ni—B alloy is more preferably 1.0% by mass, still more preferably 2.0% by mass, still even more preferably 5.0% by mass. The upper limit of the content of B is more preferably 18.0% by mass, still more preferably 15.0% by mass.

A thickness of the first layer 110 is preferably 2 to 20 μm. When a lower limit of the thickness of the first layer 110 is 2 μm or more, inelastic strain caused due to a difference in coefficient of thermal expansion between the cylindrical part 11 and the second layer 120 can be relieved more stably. When the thickness of the first layer 110 is 20 μm or less, it is possible to prevent or reduce a defect or cracking that may occur in the first layer 110 more stably. The lower limit of the thickness of the first layer 110 is more preferably 5 μm, still more preferably 8 μm. An upper limit of the thickness of the first layer 110 is more preferably 15 μm, still more preferably 12 μm.

Second Layer

The second layer 120 is a plating layer that is stacked on the first layer 110. The second layer 120 is consisting of nickel. By forming the second layer 120, a passivation film formed on a surface of the first layer 110 is removed, and adhesiveness between the first layer 110 and the second layer 120 can be increased. In addition, on a surface of the second layer 120, a passivation film is hardly formed. Moreover, P or B contained in the first layer 110 diffuses into the second layer 120 under the environment at 700° C. This makes copper atoms contained in the third layer 130 less likely to enter the second layer 120. It is thereby possible to increase adhesiveness between the second layer 120 and the third layer 130 at exposure to the 700° C. thermal cycles. Note that consisting of nickel includes a case where the nickel contains impurities. In other words, the second layer 120 may be a plating layer that is consisting of nickel and impurities.

A thickness of the second layer 120 is preferably 0.1 to 5.0 μm. When the thickness of the second layer 120 is 0.1 μm or more, a passivation film on the first layer 110 can be removed more sufficiently. When the thickness of the second layer 120 is 5.0 μm or less, an alloying element such as P and B is likely to diffuse from the first layer 110, so that a diffusion velocity of copper in the second layer 120 becomes likely to decrease. Therefore, if the thickness of the second layer 120 is 5.0 μm or less, it is possible to more stably prevent or reduce Kirkendall voids caused by mutual diffusion between nickel in the second layer 120 and copper in the third layer 130. A lower limit of the thickness of the second layer 120 is more preferably 0.2 μm, still more preferably 0.3 μm. An upper limit of the thickness of the second layer 120 is more preferably 4.5 μm, still more preferably 4.0 μm.

Third Layer

The third layer 130 is a plating layer that is stacked on the second layer 120. The third layer 130 is consisting of copper or copper alloy. Copper and copper alloy both have a low electric resistance and thus have a high conductivity. Forming the third layer 130 having a low electric resistance increases an amount of eddy currents that are generated in braking by the eddy current deceleration device 1. As a result, the braking force of the eddy current deceleration device 1 is increased.

There is no particular limit on the third layer 130 as long as the third layer 130 is consisting of copper or copper alloy. There is no particular limit on the copper alloy as long as the copper alloy is an alloy that contains 80% by mass or more of copper. However, with consideration given to operation, effect, and costs of the third layer 130 as a high-conductivity layer, the third layer 130 is preferably a plating layer consisting of copper. Note that consisting of copper or copper alloy includes a case where the copper or copper alloy contains impurities. In other words, the third layer 130 may be a plating layer that is consisting of copper and impurities or may be a plating layer that is consisting of copper alloy and impurities.

A thickness of the third layer 130 is preferably 90 to 300 μm. When the thickness of the third layer 130 is 90 μm or more, the high conductivity can be kept stably. Even when the thickness of the third layer 130 is larger than 300 μm, its conductive performance plateaus out. A lower limit of the thickness of the third layer 130 is more preferably 100 μm, still more preferably 120 μm. An upper limit of the thickness of the third layer 130 is more preferably 280 μm, still more preferably 250 μm.

Fourth Layer

The fourth layer 140 is a plating layer that is stacked on the third layer 130. The fourth layer 140 is consisting of nickel alloy. The fourth layer 140 is disposed between the third layer 130 and the fifth layer 150. The fourth layer 140 restrains thermal diffusion of copper atoms from the third layer 130 and thermal diffusion of nickel atoms from the fifth layer 150.

The fourth layer 140 is consisting of nickel alloy. There is no particular limit on the nickel alloy as long as the nickel alloy is an alloy that contains 50% by mass or more of nickel. The nickel alloy is selected from the group consisting of, for example, Ni—W alloy, Ni—Fe alloy, Ni—B alloy, Ni—Co alloy, Ni—P alloy, and Ni—P—B alloy. Note that consisting of nickel alloy includes a case where the nickel alloy contains impurities. In other words, the fourth layer 140 may be a plating layer that is consisting of nickel alloy and impurities. In addition, the nickel alloy may contain a plurality of alloying elements. In other words, the fourth layer 140 may be a plating layer in which the nickel alloy consists of: at least one type selected from the group consisting of tungsten (W), iron (Fe), boron (B), cobalt (Co), and phosphorus (P), with the balance being nickel and impurities.

In a case where nickel alloy contains tungsten (W), iron (Fe), boron (B), cobalt (Co), or phosphorus (P) as an alloying element, a diffusion velocity of copper in the nickel alloy containing one of these alloying elements is low compared with a diffusion velocity of copper in nickel. Therefore, copper atoms contained in the third layer 130 are less likely to enter the fourth layer 140.

In a case where the nickel alloy is Ni—W alloy, the nickel alloy consists of tungsten (W) with the balance being nickel (Ni) and impurities. A content of W is preferably 1 to less than 50% by mass. When the content of W is 1% by mass or more, it is possible to enhance an effect of restraining diffusion of copper. On the other hand, when the content of W is less than 50% by mass, it is possible to restrain a hardness of the fourth layer 140 from increasing and restrain the fourth layer 140 from peeling off or cracking. A lower limit of the content of W is more preferably 10% by mass. An upper limit of the content of W is more preferably 40% by mass.

In a case where the nickel alloy is Ni—Fe alloy, the nickel alloy consists of iron (Fe) with the balance being nickel (Ni) and impurities. A content of Fe is preferably 1 to 15% by mass. When the content of Fe is 1% by mass or more, it is possible to enhance the effect of restraining diffusion of copper. On the other hand, when the content of Fe is 15% by mass or less, it is possible to restrain a coefficient of thermal expansion of the fourth layer 140 from becoming small excessively. As a result, it is possible to increase adhesiveness of the fourth layer 140 in a case of experiencing thermal cycles. A lower limit of the content of Fe is more preferably 3% by mass. An upper limit of the content of Fe is more preferably 12% by mass.

In a case where the nickel alloy is Ni—B alloy, the nickel alloy consists of boron (B) with the balance being nickel (Ni) and impurities. A content of B is preferably 1 to 20% by mass. When the content of B is 1% by mass or more, it is possible to enhance the effect of restraining diffusion of copper, thus restraining Kirkendall voids more stably. On the other hand, when the content of B is 20% by mass or less, it is possible to restrain the hardness of the fourth layer 140 from increasing, increase toughness, and restrain the fourth layer 140 from peeling off or cracking. A lower limit of the content of B is more preferably 2% by mass, still more preferably 5% by mass. An upper limit of the content of B is more preferably 18% by mass, still more preferably 15% by mass.

In a case where the nickel alloy is Ni—Co alloy, the nickel alloy consists of cobalt (Co) with the balance being nickel (Ni) and impurities. A content of Co is preferably 1 to less than 50% by mass. When the content of Co is 1% by mass or more, it is possible to enhance the effect of restraining diffusion of copper. On the other hand, when the content of Co is less than 50% by mass, it is possible to restrain a hardness of the fourth layer 140 from increasing and restrain the fourth layer 140 from peeling off or cracking. A lower limit of the content of Co is more preferably 10% by mass. An upper limit of the content of Co is more preferably 40% by mass.

In a case where the nickel alloy is Ni—P alloy, the nickel alloy consists of phosphorus (P) with the balance being nickel (Ni) and impurities. A content of P is preferably 1 to 20% by mass. When the content of P is 1% by mass or more, it is possible to enhance the effect of restraining diffusion of copper. On the other hand, when the content of P is 20% by mass or less, it is possible to restrain a hardness of the fourth layer 140 from increasing and restrain the fourth layer 140 from peeling off or cracking. A lower limit of the content of P is more preferably 2% by mass. An upper limit of the content of P is more preferably 14% by mass.

In a case where the nickel alloy is an alloy that consists of: at least two or more types selected from the group consisting of tungsten (W), iron (Fe), boron (B), cobalt (Co), and phosphorus (P), with the balance being nickel and impurities, a total content of alloying elements (W, Fe, B, Co, and P) is 1 to less than 50% by mass, the content of W is less than 50% by mass, the content of Fe is 15% by mass or less, the content of B is 20% by mass or less, the content of Co is less than 50% by mass, and the content of P is 20% by mass or less. An upper limit of the total content of the alloying elements (W, Fe, B, Co, and P) is more preferably 40% by mass.

A thickness of the fourth layer 140 is preferably 5 to 20 μm. When the thickness of the fourth layer 140 is 5 μm or more, it is possible to restrain thermal diffusion of copper atoms from the third layer 130 and thermal diffusion of nickel atoms from the fifth layer 150 more stably. When the thickness of the fourth layer 140 is 20 μm or less, it is possible to more stably prevent or reduce cracking resulting from strain caused by a difference in coefficient of thermal expansion between the third layer 130 and the fourth layer 140. A lower limit of the thickness of the fourth layer 140 is more preferably 8 μm, still more preferably 10 μm. An upper limit of the thickness of the fourth layer 140 is more preferably 15 μm, still more preferably 12 μm.

Fifth Layer

The fifth layer 150 is a plating layer that is stacked on the fourth layer 140. The fifth layer 150 is consisting of nickel. Nickel is excellent in oxidation resistance within the temperature range of 600 to 700° C. In addition, nickel is soft, being rich in ductility. For those reasons, the fifth layer 150 being a layer consisting of nickel can restrain cracking from occurring in the plating layer as a whole in a case of experiencing thermal cycles or thermal shock. As a result, the fifth layer 150 acts on prevention of oxidation of the third layer 130, which is a high-conductivity layer. Note that consisting of nickel includes a case where the nickel contains impurities. In other words, the fifth layer 150 may be a plating layer that is consisting of nickel and impurities.

A thickness of the fifth layer 150 is preferably 20 to 150 μm. When the thickness of the fifth layer 150 is 20 μm or more, it is possible to prevent or reduce an exposure of a plating layer below the fifth layer 150 more stably. Even when the thickness of the fifth layer 150 is more than 100 μm, a resulting effect becomes unchanged. A lower limit of the thickness of the fifth layer 150 is more preferably 30 μm, still more preferably 40 μm. An upper limit of the thickness of the fifth layer 150 is more preferably 140 μm, still more preferably 130 μm.

Additional Plating Layer

The eddy current deceleration device 1 according to the present disclosure may further include another plating layer on the inner circumferential surface of the cylindrical part 11 of the rotor 10. For example, nickel strike plating may be additionally performed between the fourth layer 140 and the fifth layer 150. It is thereby possible to further increase adhesiveness between the fourth layer 140 and the fifth layer 150.

Method for Measuring Composition of Each Plating Layer

A composition of each plating layer is measured with, for example, wavelength-dispersive X-ray (WDX), a scanning electron microscope (SEM), and energy dispersive X-ray (EDX). Specifically, a specimen that has a cross section perpendicular to the axial direction of the cylindrical part 11 of the rotor 10 and includes the plating layers is cut out, embedded in a resin, and polished. A cross section of each plating layer perpendicular to the axial direction of the cylindrical part 11 is subjected to observation under an SEM, by which the plating layer is identified. In addition, the cross section of each plating layer identified is subjected to elementary composition analysis using WDX or EDX. For the second layer 120 and the fifth layer 150, nickel is identified. For the third layer 130, copper is identified. For the first layer 110 and the fourth layer 140, a proportion (mass %) of an alloying element (e.g., W, Fe, B, Co, or P) to 100% by mass of all detected elements (Ni and the alloying elements) is calculated.

Method for Measuring Thickness of Each Plating Layer

A thickness of each plating layer is measured by the following method. Specifically, a specimen that has a cross section perpendicular to the axial direction of the cylindrical part 11 of the rotor 10 and includes the plating layers is cut out, embedded in a resin, and polished. A cross section of each plating layer perpendicular to the axial direction of the cylindrical part 11 is subjected to observation using an optical microscope, by which the plating layer is identified. A thickness of the plating layer identified is measured. The thickness of each plating layer is defined as a shortest distance of the plating layer in the radial direction of the cylindrical part 11. Alternatively, the thickness of each plating layer can be measured also by a thickness meter. Specifically, after each plating layer is formed, a thickness meter of an ultrasound type, an electromagnetic type, an eddy-current type, or the like is pressed against the inner circumferential surface 100 of the rotor 10 (a surface of the plating layer) to measure the thickness of the plating layer.

Production Method

An example of a production method for the eddy current deceleration device 1 according to the present disclosure will be described. The production method described below is an example for producing the eddy current deceleration device 1 according to the present disclosure. Therefore, the eddy current deceleration device 1 having the above-described configuration may be produced by a production method other than the production method described below.

A production method for the eddy current deceleration device 1 according to the present disclosure includes a cylindrical part forming process of forming the cylindrical part 11 of the rotor 10 of the eddy current deceleration device 1, a plating process for forming plating layers on the formed cylindrical part 11, a rotor forming process of forming the rotor 10 from the cylindrical part 11 with the plating layers formed thereon, and a process of assembling the eddy current deceleration device 1 from the formed rotor 10. Each process will be described below.

Cylindrical Part Forming Process

In the cylindrical part forming process, the cylindrical part 11 of the rotor 10 of the eddy current deceleration device 1 is formed by a well-known method. For example, an ingot is produced from molten steel by an ingot-making process. Alternatively, a bloom or a billet may be produced from molten steel by a continuous casting process. The produced billet is subjected to well-known hot forging and further subjected to a quenching process and a tempering process. An outer circumferential surface of an intermediate product resulting from the tempering is machined to have cooling fins 11F. It will suffice to perform the machining by a well-known method. The cylindrical part 11 is formed through the above-described process.

Plating Process

On the formed cylindrical part 11, the plating layers are formed. An example of a method for forming each plating layer will be described.

First Layer

The first layer 110 is formed on the inner circumferential surface 100 of the cylindrical part 11. The first layer 110 is formed by a wet electroless plating process or an electroplating process. Plating solution contains nickel ions and ions of the alloying elements.

In a case where Ni—B alloy plating is to be formed as the first layer 110, the plating solution contains, for example, nickel sulfate: 15 to 80 g/L and sodium borohydride: 0.2 to 2.0 g/L. A commercial Ni—B plating solution is available as the plating solution. The Ni—B alloy plating may be formed by an electroless plating process. In this case, conditions for the electroless plating include, for example, temperature: 60 to 100° C. and pH: 12 to 14. The conditions for the electroless plating can be set as appropriate.

In a case where Ni—P alloy plating is to be formed as the first layer 110, the plating solution contains, for example, nickel sulfate: 15 to 150 g/L and sodium phosphinate: 5 to 130 g/L. A commercial Ni—P plating solution is available as the plating solution. The Ni—P alloy plating may be formed by an electroless plating process. In this case, conditions for the electroless plating include, for example, temperature: 30 to 100° C. and pH: 4 to 11. The conditions for the electroless plating can be set as appropriate.

Second Layer

The second layer 120 is formed on the first layer 110. The second layer 120 can be formed by a wet electroplating process. Plating solution contains nickel ions. The Wood's nickel bath is available as the plating solution. The Wood's nickel bath contains nickel chloride: 150 to 320 g/L. Conditions for the electroplating include, for example, current density: 1 to 15 A/dm$^2$, temperature: 10 to 40° C., and pH: 1 to 2. The other conditions for the electroplating can be set as appropriate.

Third Layer

The third layer 130 is formed on the second layer 120. The third layer 130 can be formed by a wet electroplating process. Commercial copper cyanide plating bath, copper pyrophosphate plating bath, copper sulfate plating bath, copper chloride plating bath, and the like are available as plating solution. In a case where the second layer 120 to be formed is made of copper alloy, the plating bath further contains alloying elements. For example, in a case of the copper cyanide plating bath, the plating solution contains copper(I) cyanide: 15 to 100 g/L. Conditions for the electroplating include, for example, current density: 1 to 8 A/dm$_2$, temperature: 40 to 70° C., and pH: 8 to 13. In a case of the copper sulfate plating bath, the plating solution contains copper sulfate: 40 to 300 g/L. Conditions for the electroplating include, for example, current density: 0.5 to 15 A/dm$^2$, temperature: 15 to 60° C., and pH: less than 1. The other conditions for the electroplating can be set as appropriate.

Fourth Layer

The fourth layer 140 is formed on the third layer 130. The fourth layer 140 is formed by a wet electroless plating process or an electroplating process. Plating solution contains nickel ions and ions of the alloying elements. Conditions for the plating process can be set as appropriate. The fourth layer 140 can be produced by the same method as the first layer 110.

Fifth Layer

The fifth layer 150 is formed on the fourth layer 140. The fifth layer 150 is formed by a wet electroplating process. Plating solution contains nickel ions. Commercial Watts bath, Wood's nickel bath, nickel chloride plating bath, nickel sulfamate plating bath, and the like are available as the plating solution. For example, in a case of the Watts bath, the plating solution contains nickel sulfate: 150 to 350 g/L and nickel chloride: 30 to 70 g/L. Conditions for the electroplating include, for example, current density: 1 to 12 A/dm$^2$, temperature: 35 to 80° C., and pH: 3 to 5. The Wood's nickel bath contains nickel chloride: 150 to 320 g/L. Conditions for the electroplating include, for example, current density: 1 to 15 A/dm$^2$, temperature: 10 to 40° C., and pH: 1 to 2. In a case of the nickel sulfamate plating bath, the plating solution contains nickel sulfamate: 300 to 600 g/L. Conditions for the electroplating include, for example, current density: 1 to 30 A/dm$^2$, temperature: 35 to 70° C., and pH: 3 to 5. The conditions for the electroplating can be set as appropriate.

The plating layers are formed on the inner circumferential surface 100 of the cylindrical part 11 under the above conditions, by which the cylindrical part 11 is produced. Subsequently, the produced cylindrical part 11 is connected by welding to the arm parts 12 and the wheel part 13 that have been prepared, by which the rotor 10 is produced. It will suffice to perform the welding by a well-known method. The rotor 10 is produced through the above-described process. In addition, the produced rotor 10 and the prepared stator 20 are assembled into the eddy current deceleration device 1.

By the production method described above, the eddy current deceleration device 1 according to the present disclosure can be produced. Note that the production method for the eddy current deceleration device 1 according to the present disclosure is not limited to the above-described production method. As long as the eddy current deceleration device 1 having the above-described configuration can be produced, the production method for the eddy current deceleration device 1 according to the present disclosure may be another production method other than the above-described production method. However, the above described production method is a preferable example of producing the eddy current deceleration device 1 according to the present disclosure.

Example

To confirm durability of the eddy current deceleration device according to the present disclosure against thermal cycles, a test described below was conducted. As specimens, cylindrical parts for a rotor each of which included plating layers shown in Table 1 formed on an inner circumferential surface thereof were prepared. A composition and a thickness of each plating layer formed were measured by the methods described above. Results of the measurement are shown in Table 1.

Table 1

Repetitive Brake Test

The produced cylindrical parts for a rotor were used to produce eddy current deceleration devices. The produced eddy current deceleration devices were each attached to a rotation test machine and subjected to an investigation as to durability in a case of experiencing thermal cycles. Specifically, the eddy current deceleration devices were subjected

TABLE 1

| | First layer | | | Second layer | | Third layer | | | Fourth layer | | | Fifth layer | | | | |
|---|---|---|---|---|---|---|---|---|---|---|---|---|---|---|---|---|
| Test No. | Type (mass %) | Plating method | Thickness (μm) | Type (mass %) | Thickness (μm) | Type (mass %) | Plating bath | Thickness (μm) | Type (mass %) | Plating method | Thickness (μm) | Type | Plating method | Thickness (μm) | Strike | Test result |
| 1 | Ni-3.0% P | Electroless | 7 | Ni | 2.2 | Cu | Copper sulfate | 200 | Ni-10% P | Electroless | 7 | Ni | Electrolytic | 110 | Yes | ◎ |
| 2 | Ni-4.0% P | Electroless | 13 | Ni | 1.3 | Cu | Copper sulfate | 240 | Ni-10% P | Electroless | 8 | Ni | Electrolytic | 80 | Yes | ◎ |
| 3 | Ni-5.0% P | Electroless | 6 | Ni | 1.4 | Cu | Copper sulfate | 240 | Ni-10% P | Electroless | 14 | Ni | Electrolytic | 80 | Yes | ◎ |
| 4 | Ni-4.0% P | Electroless | 15 | Ni | 0.7 | Cu | Copper cyanide | 240 | Ni-10% P | Electroless | 9 | Ni | Electrolytic | 130 | Yes | ◎ |
| 5 | Ni-1.0% B | Electroless | 19 | Ni | 0.9 | Cu | Copper sulfate | 200 | Ni-10% P | Electroless | 11 | Ni | Electrolytic | 120 | Yes | ◎ |
| 6 | Ni-1.5% B | Electroless | 15 | Ni | 1.2 | Cu | Copper sulfate | 250 | Ni-10% P | Electroless | 8 | Ni | Electrolytic | 80 | Yes | ◎ |
| 7 | Ni-1.5% B | Electroless | 9 | Ni | 1.0 | Cu | Copper cyanide | 240 | Ni-10% P | Electroless | 10 | Ni | Electrolytic | 80 | Yes | ◎ |
| 8 | Ni-5.0% P | Electroless | 8 | Ni | 2.1 | Cu | Copper sulfate | 110 | Ni-30% W | Electrolytic | 8 | Ni | Electrolytic | 50 | Yes | ◎ |
| 9 | Ni-9.0% P | Electroless | 12 | Ni | 2.5 | Cu | Copper sulfate | 160 | Ni-15% Co | Electrolytic | 12 | Ni | Electrolytic | 60 | Yes | ◎ |
| 10 | Ni-4.0% P | Electroless | 9 | — | — | Cu | Copper sulfate | 190 | Ni-10% P | Electroless | 10 | Ni | Electrolytic | 100 | Yes | X |
| 11 | Ni-0.5% P | Electroless | 10 | Ni | 0.9 | Cu | Copper sulfate | 200 | Ni-10% P | Electroless | 10 | Ni | Electrolytic | 90 | Yes | ○ |
| 12 | Ni-4.0% P | Electroless | 14 | Ni | 6.0 | Cu | Copper sulfate | 190 | Ni-10% P | Electroless | 11 | Ni | Electrolytic | 70 | Yes | ○ |
| 13 | Ni-0.02% B | Electroless | 7 | Ni | 1.2 | Cu | Copper sulfate | 220 | Ni-10% P | Electroless | 10 | Ni | Electrolytic | 110 | Yes | ○ |
| 14 | Ni-10% Fe | Electrolytic | 10 | Ni | 2.3 | Cu | Copper sulfate | 180 | Ni-10% P | Electroless | 8 | Ni | Electrolytic | 70 | Yes | X |

The column "Type (mass %)" for the first layer and the fourth layer in Table 1 indicates types of formed alloy platings and their contents of alloying elements. For example, "Ni-3.0% P" for a first layer of Test No. 1 indicates that the first layer of the Test No. 1 was an alloy plating layer containing 3.0% by mass of phosphorus with the balance being nickel and impurities.

First layers were formed by using plating baths containing nickel and respective alloying elements under conditions shown in Table 1. A temperature of the plating baths was 90° C. Second layers were formed by using the Wood's nickel bath in which hydrochloric acid was added to nickel chloride. A temperature of the plating baths was 30° C. A current value was set at 7 to 8 A/dm$^2$, and by changing a process duration between 3 and 25 minutes, plating thicknesses were adjusted. Third layers were formed by an electroplating process with the copper cyanide plating bath or the copper sulfate plating bath. A temperature of the copper cyanide plating bath was 50° C., and a temperature of the copper sulfate plating bath was 40° C. Fourth layers were formed by using plating baths containing nickel and respective alloying elements under conditions shown in Table 1. Fifth layers were formed by an electroplating process with the Watts bath. A temperature of plating solution was set at 50° C. A thickness of each plating layer was measured with a thickness meter after the plating layer was formed.

to a repetitive brake test. In the repetitive brake test, a rotation speed of a rotor was set to be constant at 2000 rpm, and braking and non-braking were alternated to apply temperature fluctuations to the rotor repeatedly. Durations of the braking and the non-braking were adjusted so that a maximum temperature of an inner surface of the rotor became about 700° C., and a minimum temperature became about 100° C. The braking and the non-braking were alternated by 10000 cycles. After the test, a cross section of each cylindrical part of the rotor perpendicular to an axial direction of the cylindrical part was subjected to microscopic observation under an optical microscope, to investigate an occurrence state of cracking in the plating layers. In Table 1, double circles (◎) each indicate that neither void nor peeling occurred between the second layer and the third layer. Open circles (○) each indicate that a void occurred between the second layer and the third layer, while peeling resulting from a void did not occur. Cross marks (x) each indicate that both a void and peeling resulting from the void occurred between the second layer and the third layer.

Results of Evaluation

Referring to Table 1, cylindrical parts for a rotor of Test No. 1 to Test No. 9 and Test No. 11 to Test No. 13 each included proper plating layers on their inner circumferential surfaces. Specifically, the cylindrical parts each included a second layer made of nickel between a first layer made of an Ni—P alloy or an Ni—B alloy and a third layer made of copper or a copper alloy. Thus, the plating layers of each of Test No. 1 to Test No. 9 and Test No. 11 to Test No. 13 after the repetitive brake test did not have peeling between their second layers and third layers. In other words, eddy current deceleration devices of Test No. 1 to Test No. 9 and Test No. 11 to Test No. 13 exhibited excellent durability at exposure to the 700° C. thermal cycles.

In Test No. 1 to Test No. 9, which each include plating layers the first layer of which is selected from the group consisting of an Ni—P alloy that contained 2.0 to 20.0% by mass of P with the balance being Ni and impurities and a Ni—B alloy that contained 1.0 to 20.0% by mass of B with the balance being Ni and impurities, their plating layers after the repetitive brake test showed no peeling resulting from a void between their second layers and third layers and, furthermore, showed no void itself. In contrast, in Test No. 11, in which its first layer had a content of P of 0.5% by mass, and Test No. 13, in which its first layer had a content of P of 0.2% by mass, a void occurred between their second layers and third layers in their plating layers after the repetitive brake test. In other words, when compared with eddy current deceleration devices of Test No. 11 and Test No. 13, the eddy current deceleration devices of Test No. 1 to Test No. 9 exhibited further excellent durability at exposure to the 700° C. thermal cycles.

In Test No. 12, in which its second layer had a thickness of 6.0 μm, a void occurred between its second layer and third layer in its plating layers after the repetitive brake test. In contrast, in Test No. 1 to Test No. 9, the second layer of each of which had a thickness of 0.1 to 5.0 μm, their plating layers after the repetitive brake test showed no peeling resulting from a void between their second layers and third layers and, furthermore, showed no void itself. In other words, when compared with an eddy current deceleration device of Test No. 12, the eddy current deceleration devices of Test No. 1 to Test No. 9 exhibited further excellent durability at exposure to the 700° C. thermal cycles.

In contrast, an eddy current deceleration device of Test No. 10 had no second layer made of nickel between its first layer and third layer. As a result, its plating layers after the repetitive brake test had both occurrences of a void and peeling resulting from a void between its second layer and third layer. In other words, an eddy current deceleration device of Test No. 10 had low durability at exposure to the 700° C. thermal cycles.

In an eddy current deceleration device of Test No. 14, a composition of its first layer was a Ni—Fe alloy that contained 10% by mass of Fe with the balance being Ni and impurities. As a result, its plating layers after the repetitive brake test had both occurrences of a void and peeling resulting from a void between its second layer and third layer. In other words, an eddy current deceleration device of Test No. 14 had low durability at exposure to the 700° C. thermal cycles.

An embodiment according to the present disclosure has been described above. However, the embodiment described above is merely an example of practicing the present disclosure. The present disclosure is therefore not limited to the embodiment described above, and the embodiment described above can be modified and practiced as appropriate without departing from the scope of the present invention.

REFERENCE SIGNS LIST 1 eddy current deceleration device
10 rotor
11 cylindrical part
12 arm part
13 wheel part
20 stator
100 inner circumferential surface of cylindrical part of rotor
110 first layer
120 second layer
130 third layer
140 fourth layer
150 fifth layer

The invention claimed is:

1. An eddy current deceleration device comprising:
a stator including a cylindrical body and a plurality of magnets disposed on an outer circumferential surface of the cylindrical body; and
a rotor including a cylindrical part that houses the cylindrical body, wherein
the cylindrical part of the rotor includes, on an inner circumferential surface of the cylindrical part, in order closest to the inner circumferential surface:
a first layer consisting of one of an Ni—P alloy that is an Ni alloy consisting of P with the balance being Ni and impurities and an Ni—B alloy that is an Ni alloy consisting of B with the balance being Ni and impurities;
a second layer consisting of nickel;
a third layer consisting of one of copper and copper alloy;
a fourth layer consisting of nickel alloy; and
a fifth layer consisting of nickel.

2. The eddy current deceleration device according to claim 1, wherein the first layer consisting of one of the Ni—P alloy that contains 2.0 to 20.0% by mass of P with the balance being Ni and impurities and the Ni—B alloy that contains 1.0 to 20.0% by mass of B with the balance being Ni and impurities.

3. The eddy current deceleration device according to claim 1, wherein a thickness of the second layer is 0.1 to 5.0 μm.

4. The eddy current deceleration device according to claim 2, wherein a thickness of the second layer is 0.1 to 5.0 μm.

* * * * *